US008510456B2

(12) United States Patent
Okuyama

(10) Patent No.: US 8,510,456 B2
(45) Date of Patent: Aug. 13, 2013

(54) CONNECTION DEVICE AND PROGRAM

(75) Inventor: Takashi Okuyama, Shizuoka (JP)

(73) Assignee: Yamaha Hatsudoki Kabushiki Kaisha, Shizouka (JP)

( * ) Notice: Subject to any disclaimer, the term of this patent is extended or adjusted under 35 U.S.C. 154(b) by 786 days.

(21) Appl. No.: 12/177,975

(22) Filed: Jul. 23, 2008

(65) Prior Publication Data

US 2009/0043904 A1 Feb. 12, 2009

(30) Foreign Application Priority Data

Aug. 10, 2007 (JP) ................................ 2007-209911

(51) Int. Cl.
*G06F 15/173* (2006.01)

(52) U.S. Cl.
USPC .......................................... 709/230; 701/29.1

(58) Field of Classification Search
USPC .................. 709/230, 218, 249, 250; 701/29, 701/32, 33; 340/984–987, 438–462
See application file for complete search history.

(56) References Cited

U.S. PATENT DOCUMENTS 6,975,936 B2 * 12/2005 Akuzawa et al. ............. 701/114
7,363,129 B1 * 4/2008 Barnicle et al. ................. 701/29
2003/0214417 A1 * 11/2003 Peltz et al. .................... 340/825
2005/0177286 A1 * 8/2005 Namaky et al. ................. 701/33
2006/0095233 A1 * 5/2006 Carr et al. ..................... 702/185

FOREIGN PATENT DOCUMENTS

JP 05-059282 U 8/1993
JP 3669671 B2 7/2005

* cited by examiner

*Primary Examiner* — Ruolei Zong
(74) *Attorney, Agent, or Firm* — Keating & Bennett, LLP

(57) ABSTRACT

In a connection device connected to a network mounted in a boat, a protocol of a connection device connected to a network mounted in a boat is identified based on a communication ID in a certain message transmitted through the network. A device protocol is determined in accordance with the protocol of the network. Data communication in the network is performed in conformity with the device protocol. Accordingly, when the connection device is connected to the network, the connection device automatically identifies a protocol of the network and operates appropriately. Therefore, upward compatibility is maintained and usability is improved.

6 Claims, 6 Drawing Sheets

1
6
N
9
HUB
3
20
8
7
HUB
2
3
5
GW
HUB
4

CONNECTION DEVICE AND PROGRAM

BACKGROUND OF THE INVENTION

1. Field of the Invention

The present invention relates to a connection device connected to a network mounted on a boat, and a program executed by the connection device.

2. Description of the Related Art

Conventionally, when a connection device is connected to this type of network, it is necessary to prepare the connection device in conformity with a protocol (communication protocol) of the network. Therefore, in a case where there are plural types of protocols in the network, it is troublesome to have to prepare the same number of connection devices as number of protocols.

For a method to prevent this unnecessary complication, there have been proposed a technique disclosed in JP-U-Hei 5-59282 (hereinafter referred to as the related art 1) or a technique disclosed in JP-B-3669671 (hereinafter referred to as the related art 2).

However, the related art 1 has problems. First, it is necessary to determine a type of protocol every time that a failure diagnosis device is connected, so in a case of the device that is connected at all times, a waiting time for a complete determination is long and impractical. In addition, erroneous determination occurs more frequently, and sufficient reliability cannot be ensured.

Second, when the connection device conforming to a protocol that performs authentication (hereinafter referred to as an authentication conforming device) is connected to a network that uses a protocol that does not perform authentication (hereinafter referred to as an unauthenticated protocol), it may cause authentication failure. Therefore, upward compatibility is not ensured, and usability is decreased.

On the other hand, the related art 2 requires plural communication lines corresponding to a number of failure diagnosis circuits, making it impossible achieve a low-cost arrangement.

SUMMARY OF THE INVENTION

In order to overcome the problems described above, preferred embodiments of the present invention provide a low-cost communication device and a program that is practical and reliable, while also improving usability by ensuring upward compatibility.

To achieve this, a preferred embodiment of the present invention includes a connection device that is connected to a network mounted in a boat. The connection device includes a protocol identification section arranged to identify the protocol of a network based on specific information in a certain message transmitted through the network; a protocol determination section arranged to determine the device protocol according to the protocol of the network identified by the protocol identification section; and a data communication section arranged to perform data communication with the network using the device protocol determined using the protocol determination section.

In another preferred embodiment of the preferred invention, a non-volatile memory is preferably arranged to store a protocol of the network as protocol information.

Another preferred embodiment of the present invention includes a memory reset section arranged to erase protocol information stored in the memory in order to return to an initial state.

Also, another preferred embodiment of the present invention includes a connection device connected to a network mounted in a boat having a program which executes a protocol identification process to identify a protocol of the network based on the specific information in a certain message transmitted through the network; a protocol determination process to determine a device protocol in accordance with a protocol of the network; and a data communication process to perform data communication with the network in conformity with the device protocol.

According to another preferred embodiment of the present invention, when the connection device is connected to the network, the connection device automatically identifies a protocol of the network and operates appropriately. Therefore, it is possible to ensure upward compatibility of the connection device and improve usability. Also, because plural communication lines are not required, it is possible to achieve a low-cost configuration, unlike in prior art devices.

Also, according to another preferred embodiment of the present invention, at a second or later time of connection, a determining process of the protocol type becomes unnecessary and thus a waiting time becomes shortened so as to allow prompt and stable communication. As a result, practicality and reliability of the communication device can be improved when compared with the prior art.

Also, according to another preferred embodiment of the present invention, device protocol stored in the memory can be erased and returned to an initial state by a memory reset section. This allows the device to easily react to a change of the network to which the connection device is connected.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Descriptions of preferred embodiments of the present invention will be hereinafter provided.

Figure 1:
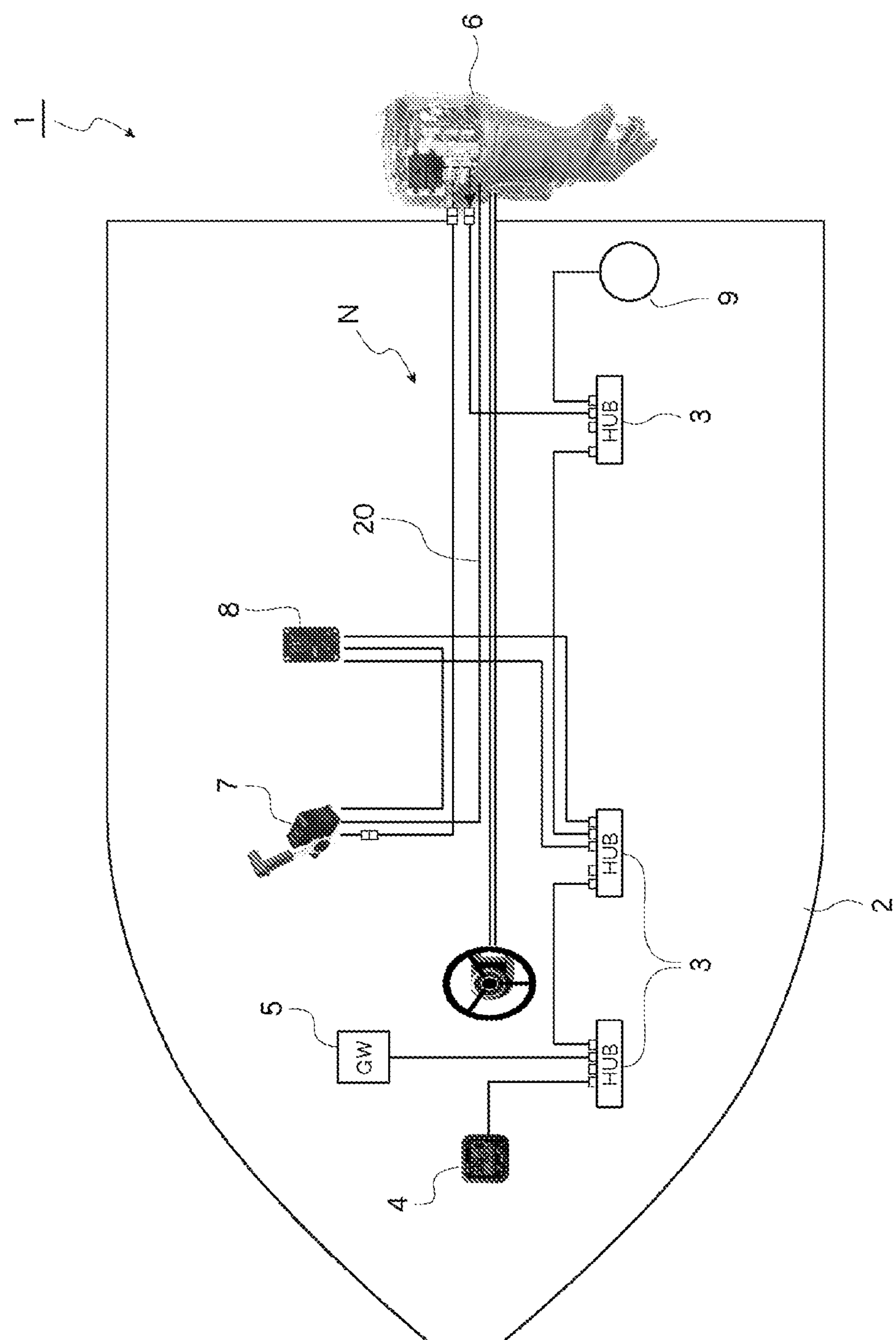
FIG. 1 is a schematic view of a connection device according to a preferred embodiment of the present invention connected to a network.

FIGS. 1 though 5B show some of the preferred embodiments according to the present invention.

First, the structure of a preferred embodiment of the present invention will be described. As shown in FIG. 1, a boat 1 preferably includes a hull 2 and an outboard motor 6 detachably attached to the rear portion (stern) of the hull 2. Also, three hubs 3, for example, are provided on the hull 2, and these hubs 3 are detachably connected with various connection devices 10 including, for example, a gauge 4, a gateway 5, a remote control 7, an immobilizer 8, and a multifunction sensor 9. A network N is defined by these devices. This network N supports both a first protocol and a second protocol. There are two types of connection devices 10. One type of connection device supports the first protocol, and the other type of connection device supports the second protocol. The first connection device starts transmitting a certain message M such as an address application message or the like when connected to the network N. Whereas the second connection device does not transmit any data when connected to the network N.

An outboard motor 6 and a remote control 7 are connected by a mechanical cable 20, for example.

Figure 2:
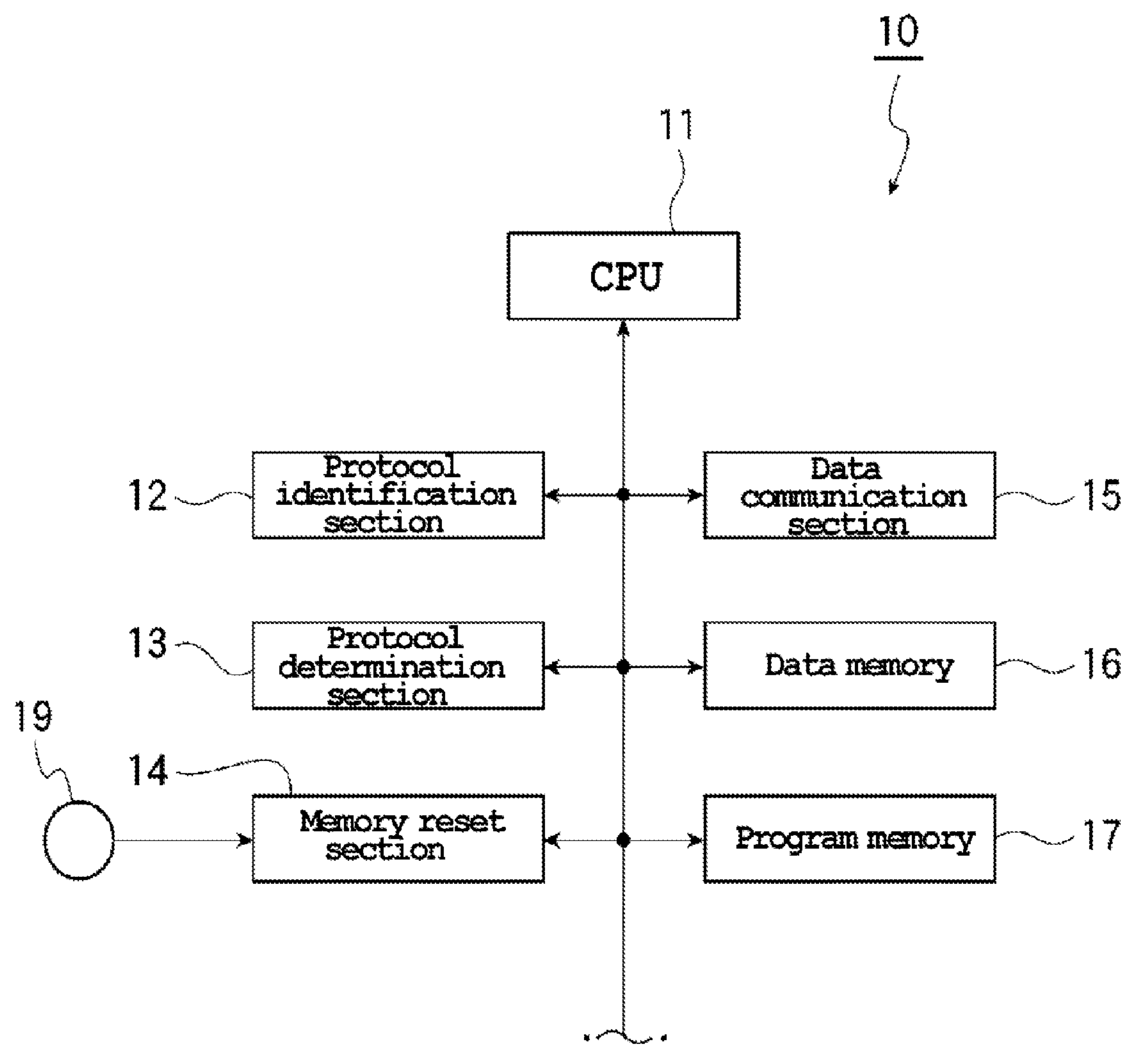
FIG. 2 is a block diagram of a connection device according to a preferred embodiment of the present invention.

As shown in FIG. 2, the connection device 10 includes a CPU (central processing unit), and the CPU 11 is connected with a protocol identification section 12, a protocol determination section 13, a memory reset section 14, a data communication section 15, anon-volatile data memory 16, and a program memory 17. Furthermore, a reset button 19 is connected to the memory reset section 14.

Figure 3:
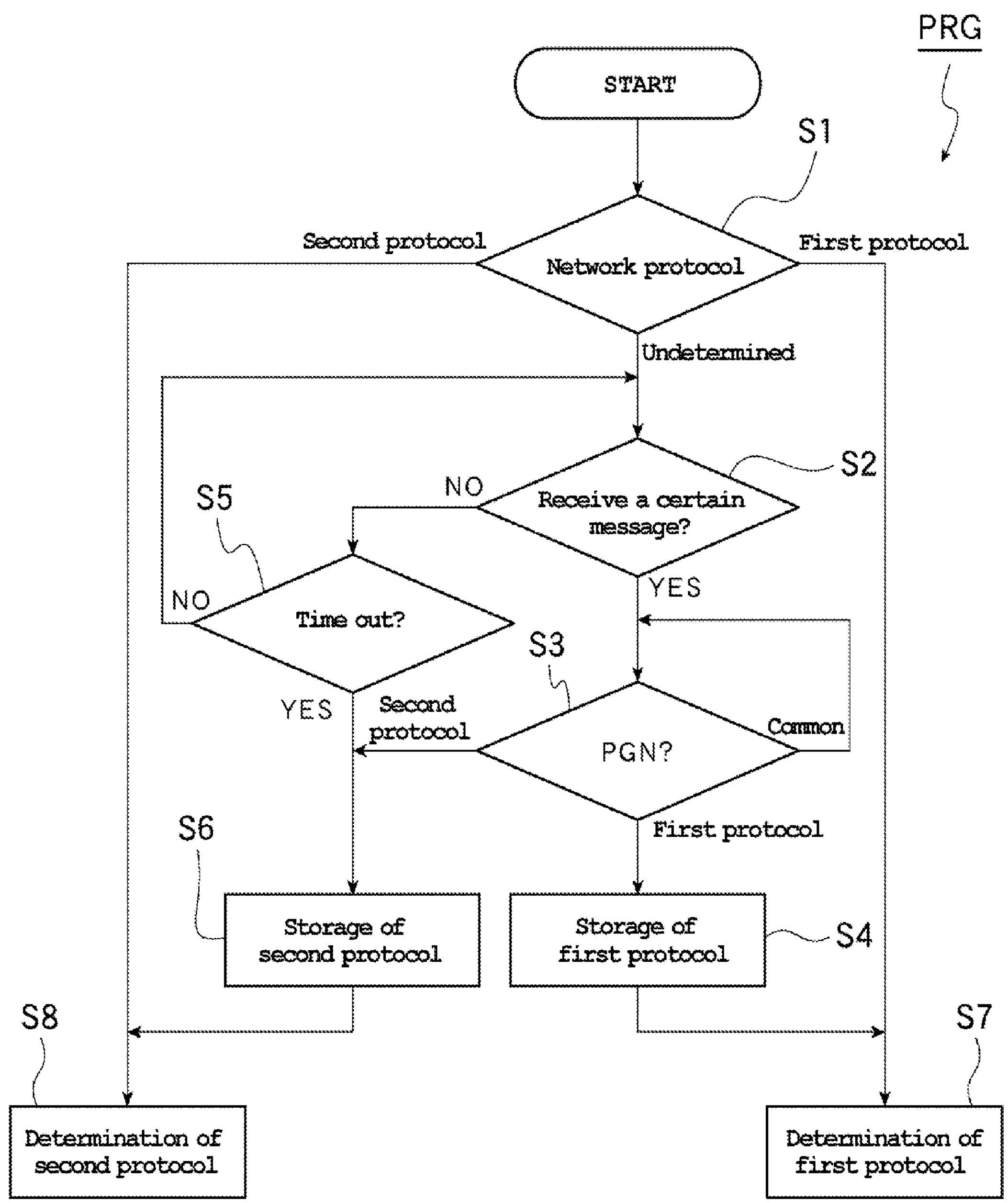
FIG. 3 is a flow chart of a protocol-switching program according to a preferred embodiment of the present invention.

Here, the data communication section 15 has a function to conform to both of the first protocol and the second protocol and perform data communication with the network N. Also, the data memory 16 is provided with an area to readably and writably store the protocol information. Furthermore, a protocol switching program PRG shown in FIG. 3 is readably stored in the program memory 17.

When the connection device 10 having the above mentioned configuration is connected to the network N for the first time, the CPU 11 reads out the protocol-switching program PRG shown in FIG. 3 from the program memory 17, and executes a protocol switching action as follows based on the protocol switching program PRG.

Figure 4:
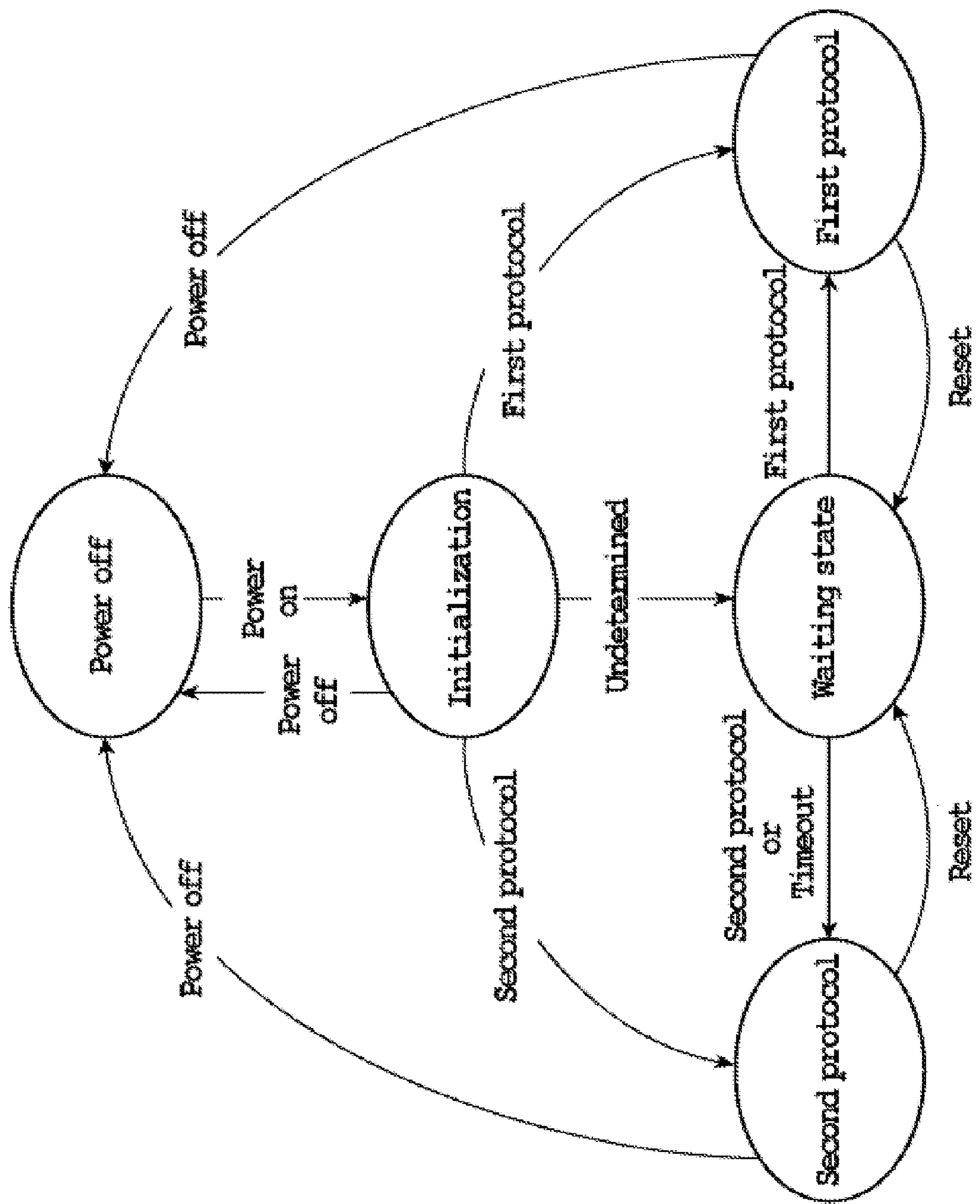
FIG. 4 is a schematic view of a change of a communication state according to a preferred embodiment of the present invention.

At first, the CPU 11 performs a predetermined initializing action (refer to the arrow indicating from "Power OFF" to "Initialization" shown in FIG. 4), and then commands an identification action of a protocol of the network N to the protocol identification section 12. When this is received, the protocol identification section 12 attempts to identify the protocol of the network N based on the protocol information stored in the data memory 16 (step S1 of the protocol switching program PRG). However, this is a first time connection, and no protocol information is stored in the data memory 16. Therefore, the protocol identification section 12 cannot identify a protocol of the network N based on the protocol information. Then, the protocol identification section 12 outputs a signal describing this information to the CPU 11.

Then, the CPU 11 changes a communication state to a waiting state (refer to the arrow indicating from "Initialization" to "Waiting State" shown in FIG. 4), and commands an acceptance check action of the certain message M to the protocol identification section 12. When this is received, the protocol identification section 12 performs an acceptance check of the certain message M transmitted from another connection device 10 connected to the network N until a predetermined waiting time period (for example, about 3 seconds) elapses (the step 2 of the protocol switching program PRG).

Figure 5A:
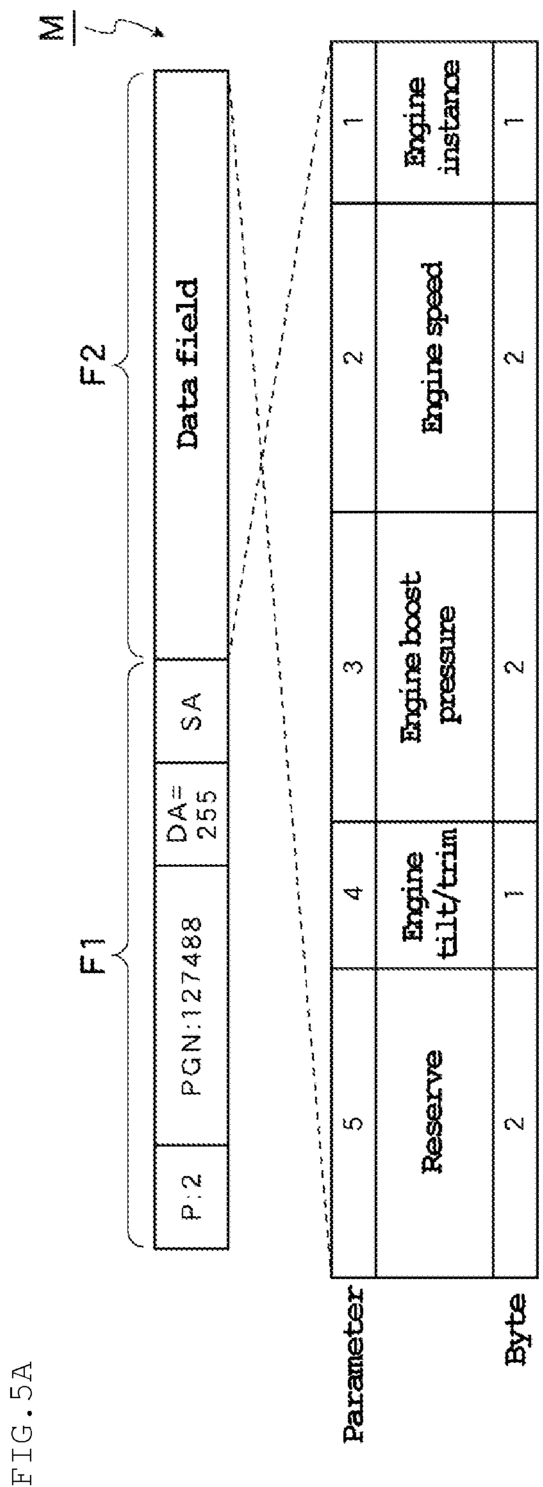
FIGS. 5A and 5B are schematic views representing certain messages according to another preferred embodiment of the present invention.
Figure 5B:
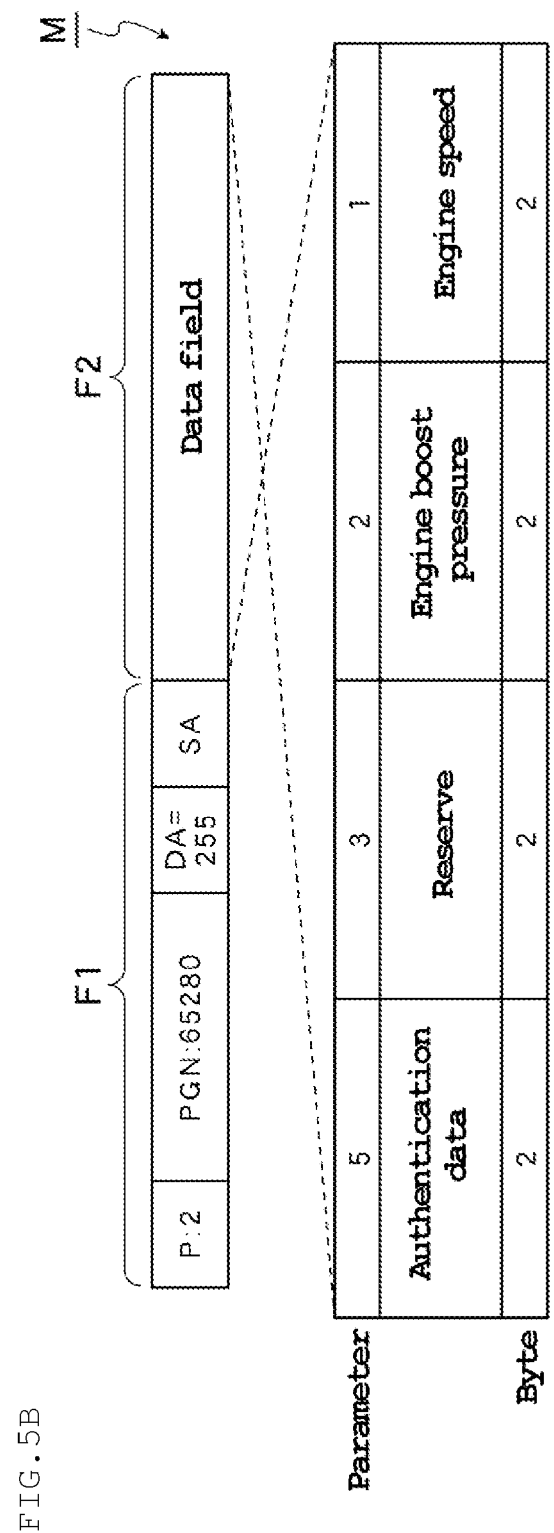

This message M, for example as shown in FIG. 5A and FIG. 5B, is configured to include an identification field F1 and a data field F2. Here, the identification field F1 stores identification information such as P (priority), PGN (communication ID), DA (destination address), SA (source address). The data field F2 stores various engine information such as an engine speed.

When a certain message M is received within a predetermined waiting time, the protocol identification section 12 identifies a protocol of the network N based on the attribution of PGN in this message M (step S3 in the protocol switching program PRG).

That is, in a case that this PGN is used in the first protocol alone (for example "127488" shown in FIG. 5A), the protocol identification section 12 determines that the protocol of the network N is the first protocol, and outputs the signal of the information to the CPU 11. The CPU 11, for the convenience of connection for a second or later time, writes the "first protocol" as the protocol information and stores it in the data memory 16 (step S4 of the protocol switching program PRG), then commands the determination action of the device protocol to the protocol determination section 13. When this is received, the protocol determination section 13 determines the device protocol as "first protocol" (step S7 of the protocol switching program PRG: refer to the arrow indicating a change from "Waiting State" to "First Protocol" shown in FIG. 4), and outputs the signal containing the information to the CPU 11. Then, the CPU 11 commands a data communication action by the device protocol to the data communication section 15. When this is received, the data communication section 15 performs data communication with the network N in conformity with the first protocol. As a result, the connection device 10 functions as a device that corresponds to the first protocol.

Also, in a case that this PGN is used in the second protocol alone (for example "65280" shown in FIG. 5B), the protocol identification section 12 determines that the protocol of the network N is the second protocol, and outputs a signal containing the information to the CPU 11. The CPU 11, for the convenience of connecting at a second or later time, writes "second protocol" as the protocol information in the data memory 16 (step S6 of the protocol switching program PRG), and then commands the determination action of the device protocol to the protocol determination section 13. When this command is received, the protocol determination section 13 determines the device protocol as "second protocol" (step S8 of the protocol switching program PRG: refer to the arrow indicating a change from "Waiting State" to "Second Protocol" shown in FIG. 4), and outputs the signal containing the information to the CPU 11. Then, the CPU 11 commands a data communication action from the device protocol to the data communication section 15. When the command is received, the data communication section 15 performs data communication with the network N in conformity with the second protocol. As a result, the connection device 10 functions as a device that corresponds to the second protocol.

In a case that this PGN commonly uses the first and second protocols, it is unknown which of the first and second protocols the network N is using, so, in this case, the protocol identification section 12 waits to receive the next message M.

On the other hand, in a case that the message M is not received within a predetermined waiting time (step S5 of the protocol switching program PRG), the protocol identification section 12 determines that the protocol of the network N is the second protocol, and outputs the signal containing the information to the CPU 11. This process is performed based on the logic that, if there is at least one device among other connection devices 10 connected to the network N, which corresponds to the first protocol, a certain message M must be received within a predetermined waiting time. In other words, if no message is received within a predetermined waiting time, the connection devices 10 connected to the network N should all correspond to the second protocol.

The CPU 11, for the convenience of connecting for a second or later time, writes the "second protocol" as the protocol information and stores the information in the data memory 16

(step S6 of the protocol switching program PRG), then commands the determination action of the device protocol to the protocol determination section 13. When this is received, the protocol determination section 13 determines the device protocol as "second protocol" (step S8 of the protocol switching program PRG, refer to the arrow indicating a change from "Waiting State" to "Second Protocol" shown in FIG. 4), and outputs the signal containing the information to the CPU 11. Then, the CPU 11 sends a data communication command using the device protocol to the data communication section 15. When the command is received, the data communication section 15 performs data communication with the network N conforming to the second protocol. As a result, the connection device 10 functions as a device corresponding to the second protocol.

Here, the procedure of making a connection for the first time is complete.

As described above, when the connection device 10 is connected to the network N, the connection device 10 automatically identifies the protocol of the network N and performs appropriately if the protocol of this network N is a first protocol or a second protocol. Therefore, even in a case where the protocol of the network N is an unauthenticated protocol and the connection device 10 is an authentication conforming device, authentication failure is prevented and upward compatibility of the connection device 10 can be maintained, and usability of the device is improved.

Also, it is possible to provide a low cost device because plural communication lines are not necessary, unlike in prior art devices.

When a power supply of the connection device 10 is turned off in a state when the device protocol is the "First Protocol", the "Second Protocol", or in an initialization state, an electric current to the CPU 11 and the like is shut off (refer to the arrow indicating a change from "Initialization" to "Power Off", the arrow indicating a change from the "First Protocol" to the "Power Off", and the arrow indicating a change from the "Second Protocol" to the "Power Off", as shown in FIG. 4). At this time, the data memory 16 is non-volatile, so that protocol information will not be erased by turning off the power supply.

When the connection device 10 is connected to the network N at a second or later time, the CPU 11 reads out the protocol-switching program PRG shown in FIG. 3 from the program memory 17 in the same way as in a first time connection, and performs a protocol switching action as follows based on the protocol switching program PRG.

At first, the CPU 11 performs a predetermined initialization action (refer to the arrow indicating a change from "Power Off" to "Initialization" shown in FIG. 4). Here, protocol information in the data memory 16 is not erased by the initialization action, but is retained even after initialization.

Next, the CPU 11 commands the identification action of a protocol of the network N to the protocol identification section 12 to begin. When this command is received, the protocol identification section 12 attempts to identify the protocol of the network N based on the protocol information stored in the data memory 16 (step S1 of the protocol switching program PRG). At this time, unlike during a first time connection, protocol information (the "First Protocol" or the "Second Protocol") is stored in the data memory 16, so that the protocol identification section 12 identifies a protocol of the network N based on this protocol information.

That is, in a case that the "first protocol" is stored in the data memory 16 as the protocol information, the protocol identification section 12 determines that the protocol of the network N is the first protocol, and outputs the signal containing this information to the CPU 11. Then, the CPU 11 commands a determination action of the device protocol be performed using the protocol determination section 13. When this command is received, the protocol determination section 13 determines the device protocol as being the "first protocol" (step S7 of the protocol switching program PRG: refer to the arrow indicating a change from "Initialization" to "First Protocol" shown in FIG. 4), and outputs the signal containing this information to the CPU 11. Then, the CPU 11 commands a data communication action to be performed by the device protocol to the data communication section 15. When the command is received, the data communication section 15 performs data communication with the network N that conforms to the first protocol. As a result, the connection device 10 functions as a device that corresponds to the first protocol.

In a case that the "second protocol" is stored in the data memory 16 as protocol information, the protocol identification section 12 determines that the protocol of the network N is the second protocol, and outputs the signal of the information to the CPU 11. Then, the CPU 11 commands a determination action of the device protocol to be performed by the protocol determination section 13. When this command is received, the protocol determination section 13 determines the device protocol to be the "Second Protocol" (step S8 of the protocol switching program PRG, refer to the arrow indicating a change from "Initialization" to the "Second Protocol" shown in FIG. 4), and outputs the signal containing this information to the CPU 11. Then, the CPU 11 commands a data communication action to be performed by the device protocol to the data communication section 15. When the command is received, the data communication section 15 performs data communication with the network N in conformity with the second protocol. As a result, the connection device 10 functions as a device that corresponds to the second protocol.

Here, the procedure of the connection for a second or later time is complete.

As described above, a process for determining a type of protocol (steps S2 to S6 in the protocol switching program PRG) becomes unnecessary because the protocol information in the data memory 16 can be referred to at the time of connection for the second or later time. Therefore, the waiting time is reduced and prompt and stable communication is possible. As a result, practicality and reliability of the communication device 10 can be improved when compared to that of prior art devices.

In accordance with a change or the like of the network N connected with the connection device 10, a reset button 19 is pressed in order to reset the protocol information in the data memory 16. In response to this action, the memory reset section 14 erases the protocol information in the data memory 16 thereby returning it to an initial state.

For example, in a case where the protocol information immediately before resetting is the "First Protocol", the memory reset section 14 erases this "First Protocol" and changes the communication state to the waiting state (refer to the arrow indicating a change from "First Protocol" to "Waiting State" shown in FIG. 4).

Also, in a case where the protocol information immediately before resetting is the "Second Protocol", the memory reset section 14 erases this "Second Protocol" and changes the communication state to the waiting state (refer to the arrow indicating a change from "Second Protocol" to "Waiting State" shown in FIG. 4).

As described above, the protocol information in the data memory 16 can be erased and returned to its initial state by pressing the reset button 19, so it can easily react to a change of the network N to which the connection device 10 is connected.

The preferred embodiments of the present invention described above explain the case in which a protocol in the network N preferably is identified based on PGN in the certain message M. However, identification of a protocol in the network N may be performed based on information other than the communication ID PGN.

Also, the preferred embodiments of the present invention described above describe a boat 1 connected preferably using a connection method wherein an outboard motor 6 and a remote control 7 are connected by a mechanical cable 20. However, it is understood that the present invention is also applicable to a boat 1 that uses a DBW (drive by wire) system, in which the ECU of the outboard motor 6 and the ECU of the remote controller 7 are electrically connected through a LAN (Local Area Network).

Furthermore, the preferred embodiments of the present invention described above include a boat 1 in which the outboard motor 6 is preferably attached to the hull 2. However, the present invention is also applicable to a boat 1 in which a boat propulsion device (such as an inboard-outboard drive) other than an outboard motor 6 is attached to the hull 2.

The present invention is widely applicable to various boats such as pleasure boats, small planing boats, personal water craft, and other water vehicles and marine vessels, etc.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A connection device connected to a network mounted in a boat, the connection device comprising:

a protocol identification section configured to identify whether a device protocol of the network is a first protocol or a second protocol;

a protocol determination section configured to determine which of the first protocol or the second protocol that the connection device should use to communicate with the network based on the device protocol identified by the protocol identification section; and a data communication section configured to perform data communication with the network in conformity with both of the first protocol and the second protocol, including the device protocol determined by the protocol determination section;

wherein the first protocol is a protocol that requires authentication at a time of connecting the connection device to the network, and the second protocol is a protocol that does not require authentication at the time of connecting the connection device to the network.

2. The connection device according to claim 1, further comprising:

a non-volatile memory arranged to store a protocol indicator of the device protocol of the network; wherein after the determination of the device protocol, the protocol determination section is arranged to perform no further protocol determination, and the device protocol is obtained based on the protocol indicator stored in the non-volatile memory.

3. The connection device according to claim 2, further comprising a memory reset arranged to erase the protocol indicator stored in the non-volatile memory in order to return the non-volatile memory to its initial state.

4. The connection device according to claim 1, further comprising:

a non-volatile memory arranged to store a protocol indicator of the device protocol of the network; wherein the protocol identification section identifies the device protocol based on the protocol indicator stored in the non-volatile memory.

5. The connection device according to claim 1, wherein when the protocol identification section cannot identity the device protocol as the first protocol after a predetermined time period, the protocol identification section identifies that the protocol is the second protocol.

6. A non-transitory computer readable medium storing a program for performing, when the program runs on a computer in a network mounted in a boat, a method comprising the steps of:

performing a protocol identification process while a connection device is connected to the network to identify whether a device protocol of the network is a first protocol or a second protocol;

performing a protocol determination process with the connection device to determine which of the first protocol or the second protocol that the connection device should use to communicate with the network based on the device protocol identified by the protocol identification process; and performing a data communication process with the connection device to perform data communication with the network in conformity with both of the first protocol and the second protocol, including the device protocol determined by the protocol determination process;

wherein the first protocol is a protocol that requires authentication at a time of connecting the connection device to the network, and the second protocol is a protocol that does not require authentication at the time of connecting the connection device to the network.

* * * * *